(12) United States Patent
Hoeptner, III

(10) Patent No.: US 7,465,399 B1
(45) Date of Patent: Dec. 16, 2008

(54) FILTERED AND UNFILTERED WATER DUCTING IN SINK FITTING

(76) Inventor: Herbert W. Hoeptner, III, 7796 Oak Springs Cir., Gilroy, CA (US) 95020

( * ) Notice: Subject to any disclaimer, the term of this patent is extended or adjusted under 35 U.S.C. 154(b) by 620 days.

(21) Appl. No.: 11/068,446

(22) Filed: Feb. 28, 2005

(51) Int. Cl.
  *B01D 61/00* (2006.01)
  *B01D 63/00* (2006.01)
  *C02F 9/00* (2006.01)
  *F16K 24/00* (2006.01)

(52) U.S. Cl. ............ 210/652; 210/257.2; 210/195.1; 210/456; 137/216; 137/216.1; 137/801

(58) Field of Classification Search ............ 210/652, 210/257.2, 195.1, 456; 137/216, 216.1, 801
See application file for complete search history.

(56) References Cited

U.S. PATENT DOCUMENTS

| 4,876,001 | A | * | 10/1989 | Supra | 210/123 |
| 4,895,654 | A | * | 1/1990 | Burrows | 210/110 |
| 4,997,553 | A | * | 3/1991 | Clack | 210/97 |
| 5,132,017 | A | * | 7/1992 | Birdsong et al. | 210/652 |
| 5,147,533 | A | * | 9/1992 | Lipshultz et al. | 210/98 |
| 5,580,444 | A | * | 12/1996 | Burrows | 210/85 |
| 5,875,807 | A | * | 3/1999 | Schulze | 137/94 |
| 6,499,501 | B1 | | 12/2002 | Hoeptner | |
| 6,510,863 | B1 | * | 1/2003 | Traylor | 137/216 |
| 6,971,400 | B1 | * | 12/2005 | Bowman et al. | 137/216 |

* cited by examiner

*Primary Examiner*—Ana M Fortuna
(74) *Attorney, Agent, or Firm*—William W. Haefliger

(57) ABSTRACT

In a multi-ducted sink fitting assembly, a waste water connection to an assembly comprises a reverse osmosis waste water upright duct associated with the fitting; a dish water upright duct associated with the fitting to flow unclean dish water upwardly; and a discharge duct extending downwardly and associated with the fitting to receive flow from both the reverse osmosis waste water duct and the dish water duct.

20 Claims, 3 Drawing Sheets

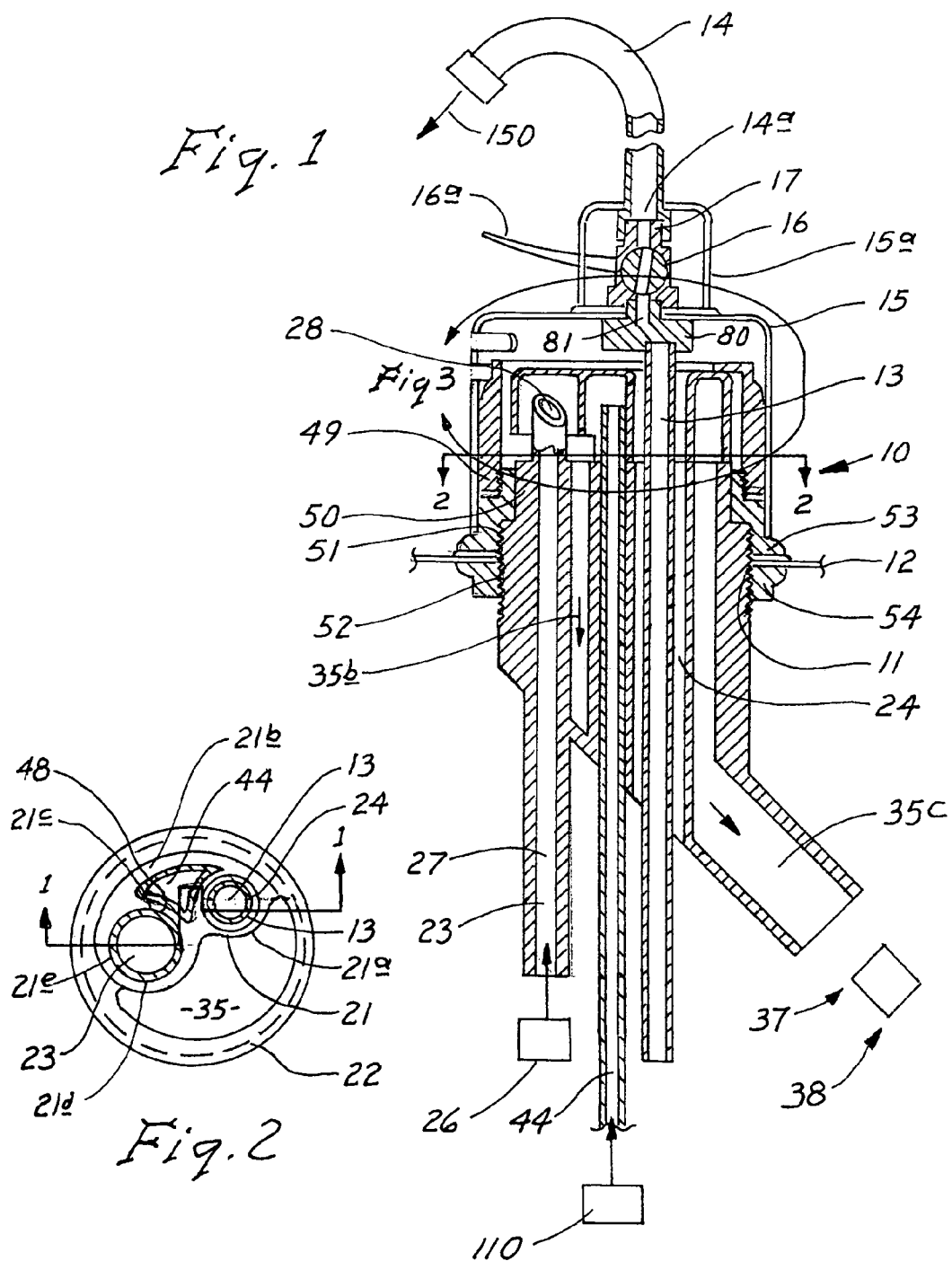

US 7,465,399 B1

FILTERED AND UNFILTERED WATER DUCTING IN SINK FITTING

BACKGROUND OF THE INVENTION

This invention relates generally to systems for flows of clean water and unclean waste water in proximity, as in kitchens; and more particularly concerns a simple, efficient, conduit system for such proximal flows, and occupying minimum space.

In many kitchens, installed sinks have multiple holes in a top panel, with two separate holes for hot and cold water conduits, and a third hole for a separate water supply conduit. A fourth hole is often employed in the plate, for a waste water conduit, that often employs a vent conduit that prevents waste water siphoning back into a dishwasher. There is need to reduce the number of such holes in such a panel, and to reduce the size of the overall space occupied by such a conduit system at the panel.

There is also need to provide for reverse osmosis waste water discharge in a simple and effective manner, enabling use of clean reverse osmosis water, in a kitchen.

SUMMARY OF THE INVENTION

It is a major object of the invention to provide a method efficiently disposing of reverse osmosis waste water, in a kitchen. Basically the method includes a) providing a multi-ducted fitting, attached to a sink panel, b) providing a waste water upright duct associated with that fitting, and providing and operating reverse osmosis apparatus from which waste water flows to that duct, c) providing and operating a dish water upright duct associated with the fitting to flow unclean dish water upwardly, d) and providing and operating a discharge duct associated with the fitting to receive flows from both the reverse osmosis waste water duct, and the said dish water flow duct, for downward flow relative to the sink.

As will be seen, the method may include openly discharging both of such flows within the fitting prior to reception of the flows into the discharge duct.

Another object includes provision of a chamber at the fitting located to receive and merge flow path from both the reverse osmosis waste water duct and the dish water duct, and for discharge of such flows to the discharge duct. As will be seen, a cap may be provided to extend over an upper open end of the dish water flow duct, the cap having a side entrance to pass reverse osmosis flow openly into merging relation with the dish water path of flow discharged via that open upper end. The chamber may be located above the sink panel, and a housing may be provided for said ducts, and to extend in a sink top panel opening.

An additional object is to provide a multi-ducted sink fitting assembly having a waste water connection, and comprising a) a reverse osmosis waste water upright duct associated with the fitting, b) a dish water upright duct associated with the fitting to flow unclean dish water upwardly, c) and a discharge duct extending downwardly and associated with the fitting to receive flows from both said reverse osmosis waste water duct and said dish water duct.

A yet further object is to provide a system for handling closely proximate flows of clean and unclean water, the latter including both dish water, and waste water from a reverse osmosis filter unit, comprising a) a first conduit for passing liquid stream A to a first discharge, b) a second conduit extending protectively about the first conduit, c) a third conduit extending proximate and lengthwise of the second conduit for passing a liquid stream B, outside the second conduit, d) and an outer housing extending about the first, second and third conduits, e) said third conduit having a free discharge proximate to, but isolated from the interior of said second conduit, f) there being a fourth conduit, proximate to the second and third conduits, and having an entrance to receive stream B discharge from a reverse osmosis filter means, and flowing from the second conduit and including said means in communication with said second conduit, g) the second, third and fourth conduits configured such that i) the second and third conduits have a primary common wall, ii) the second and fourth conduits have a second common wall, iii) the third and fourth conduits have a tertiary common wall, h) the primary, secondary and tertiary common walls have a common junction, i) and wherein such common walls extend arcuately away from the common junction, such that both the secondary common wall and the tertiary common wall bulge toward and into said fourth conduit. See U.S. Pat. No. 6,499,501 in this regard.

Yet another object is to provide a compact assembly in which at least two of the second, third and fourth conduits have a common wall. Typically three common walls may be provided, wherein i) the second and said third conduits have a primary common wall, ii) the second and fourth conduits have a secondary common wall, and iii) the third and fourth conduits have a tertiary common wall.

The common walls may, as will be seen, have a common junction, from which the common walls extend, arcuately, to closely and compactly fit within a surrounding annular mounting structure, clamped in position on a counter top.

Yet another object is to provide for drinking water flow upwardly in the first conduit, spaced from the second conduit wall, so that unclean water flows downwardly between the second and third conduit walls, isolated from the first conduit, and via the fourth conduit.

DRAWING DESCRIPTION

These and other objects and advantages of the invention, as well as the details of an illustrative embodiment, will be more fully understood from the following specification and drawings, in which:

FIG. 1 is a vertical section taken through a conduit system for handling closely proximate flows of relatively clean and relatively unclean water;

FIG. 2 is an enlarged horizontal section taken on lines 2-2 of FIG. 1;

DETAILED DESCRIPTION

Figure 3:
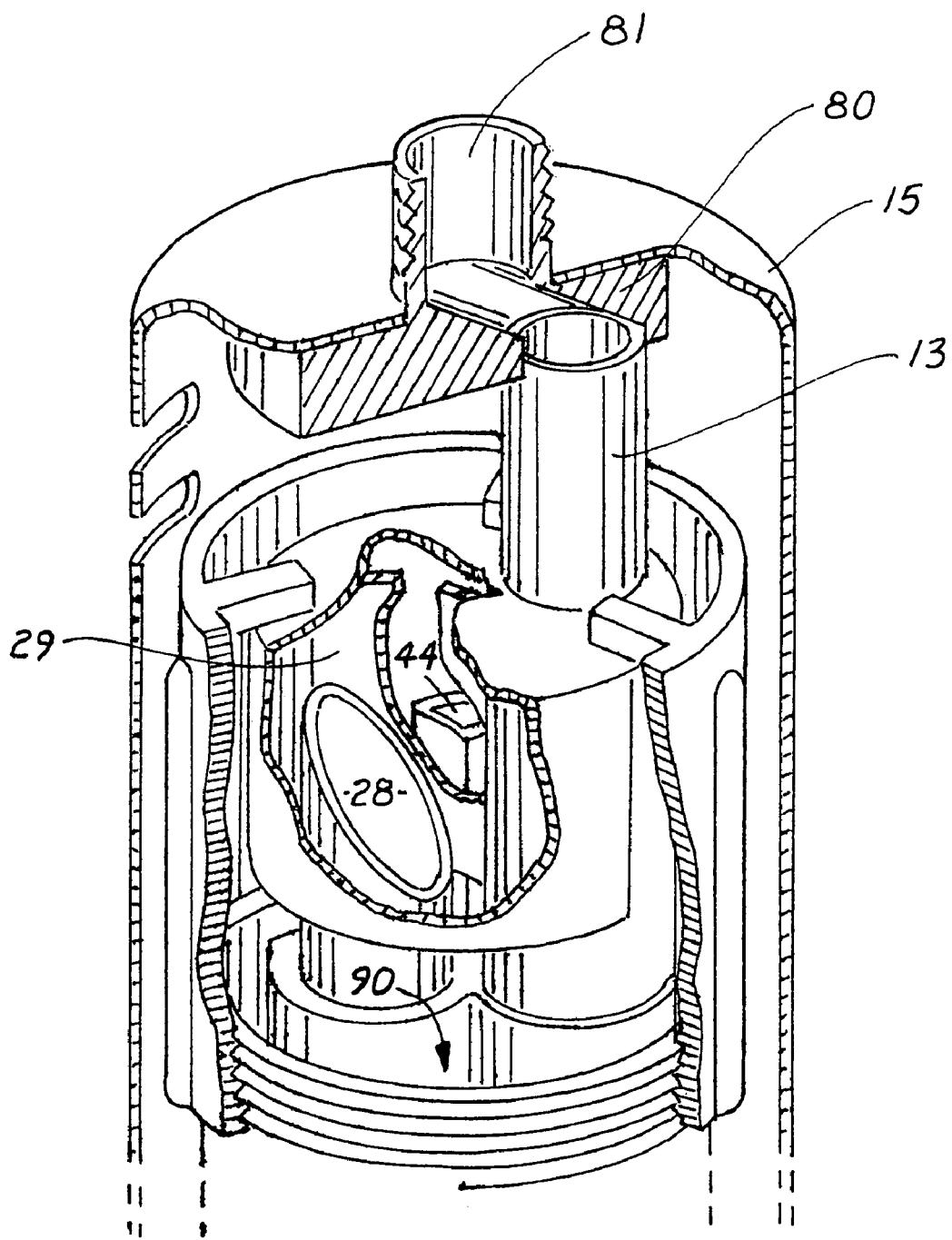
FIG. 3 is a fragmentary perspective view of the FIG. 1 system, partly broken away to show details of construction.
Figure 4:
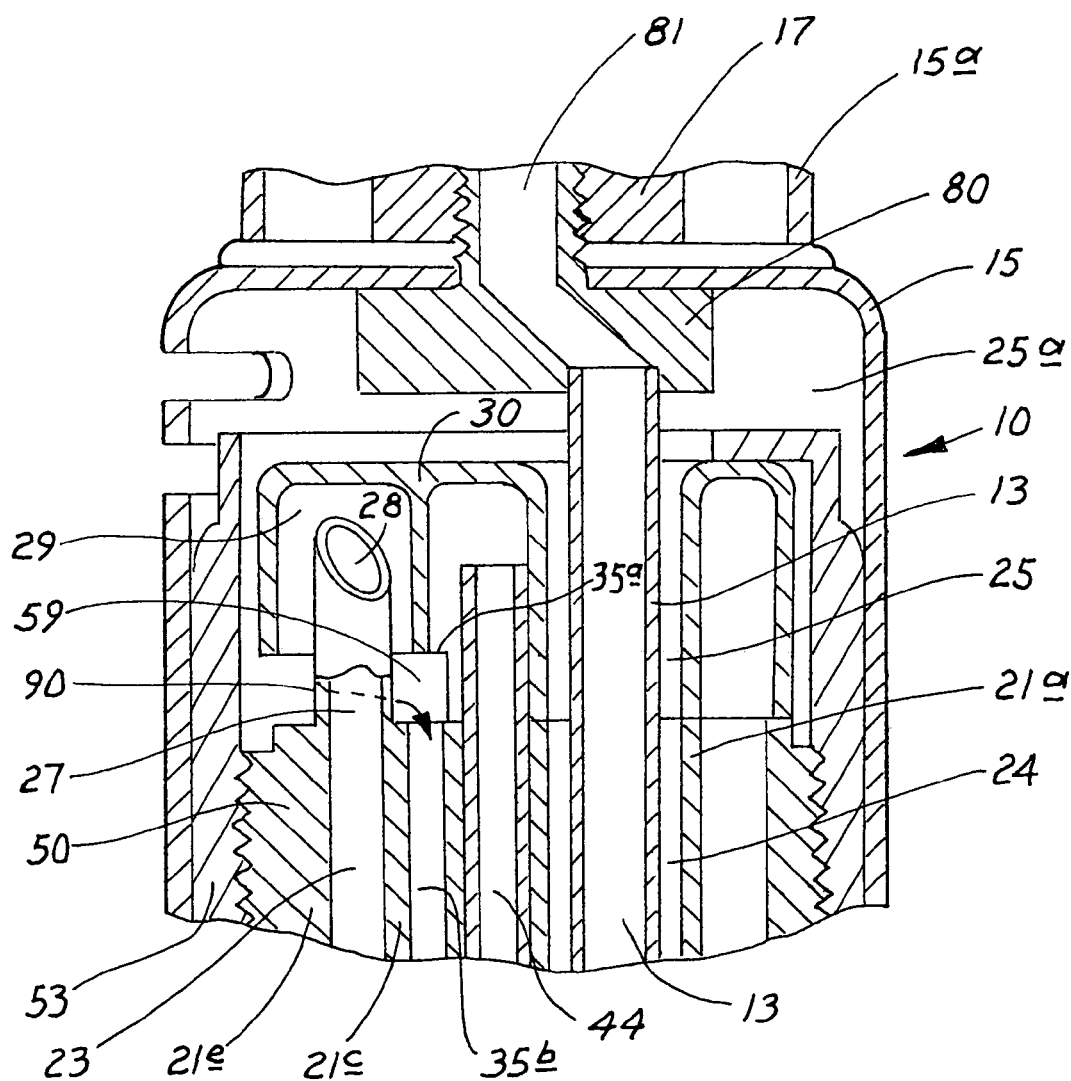
FIG. 4 is an enlarged fragmentary section taken through the upper portion of FIG. 1.

In the drawings a preferred system 10 provides for handling closely proximate flows of relatively clean and unclean water, whereby only one opening 11 in a counter top 12, or other panel, is required to pass the flows. For example, clean drinking water flows upwardly in a first conduit, in the form of a duct 13, that discharges into a tubular spout 14. Drinking water flow from the spout is indicated at 150. A valve 16 is provided within a tubular fitting 17 interposed in series between duct 13 and duct 14, as shown. The top of duct 13 fits in a nut 80 defining a passage 81 that leads to valve 16. See FIG. 4.

A second conduit or duct extends protectively around duct 13, and may take the form of web-like wall segments 21a, 21b, and 21c of second conduit structure 21 that provides interior hollow or space 24 extending lengthwise parallel to the conduit 23 and about conduit 13. Structure 21 is compactly located within cylindrical wall 22 that may be integral with the curved segments 21a, 21b, and 21c, seen in FIG. 2. Space 24 extends closely about duct 13, and is separated from a space 23 by curved segment 21c.

The upper end of conduit space 24 opens to the enlarged chambered interior 25 defined by tubular housing 15, and below top cap 15a. See FIG. 4. Space 44 defines a conduit zone for receiving contaminated water from a reverse osmosis filter unit 110. See also air passages through skirt 15a of cap 15.

The third conduit 23 as shown, is formed by web or wall segments 21c, 21d and 21e. It also extends lengthwise parallel to the first and second conduits, as referred to. Its interior typically receives unclean water as from a dish washer drain indicated at 26, to flow upwardly at 27 through counter top opening 11, and to an open discharge at 28 communicating with an upper interior (siphon-breaking) space 29 isolated from enlarged interior 25, as by provision of a wall 30 between 25 and 29. The flow paths from 44 and 23 merge in space 59 and discharge downwardly at 90 to a fourth conduit, proximate to said second and third conduits, and having an upper entrance to receive contaminate waste water flow 90. See the fourth conduit 35, having an upper side entrance 35a to receive unclean water draining from upper interior chamber or space 29, covered by cap 30, and extending downwardly at 35b at a location below open discharge 28 to conduct such water at 35c to a discharge, for example to a rotary garbage disposal unit 37 in a sink structure 38. See FIG. 4. The fourth conduit 35 is located sidewardly closely adjacent to the second and third conduits 24 and 23, for example as is seen in FIG. 2, so that all four conduits pass through the panel opening 11, providing a highly compact, multi-functional assembly, for drinking water access and for disposal of waste or unclean water.

Such compactness is further enhanced by the structure as shown in FIG. 2. Note that at least two of the second, third and fourth conduits have a common wall. For example, conduits 44 and 23 have a primary common wall 21c; conduits 44 and 35 have a tertiary common wall 21d. Those common walls have a common junction 48, and they extend arcuately away from that common junction, to fit within the annular enclosing wall 22 and retention structure 49. That structure may be provided by tubular fitting 50 extending above panel 12. That fitting may have threaded connection at 51 and 52 with upper and lower tubular clamping fittings 53 and 54 that clamp to the panel 12, as shown, holding the assembly of conduits in position, as shown.

Note in FIG. 2 that the secondary common wall 21a and the tertiary common wall 21d both bulge into or toward the fourth conduit, whereby extreme compactness of the wall structure and conduit structure as in FIG. 2 is provided, to fit through the small sink panel opening 11, for handling the liquid stream. The liquid stream in duct 14 can be designated liquid stream A; and the liquid stream in conduit 28 can be designated as liquid stream B. U.S. Pat. No. 6,599,501B1 is incorporated herein by reference.

I claim:

1. A multi-ducted sink fitting assembly, comprising
    a) a reverse osmosis waste water upright duct associated with the fitting,
    b) a dish water upright duct associated with the fitting to flow unclean dish water upwardly,
    c) and a discharge duct extending downwardly and associated with the fitting to receive flow from both said reverse osmosis waste water duct and said dish water duct,
    d) there being a housing surrounding said ducts, to be received in a kitchen sink associated panel,
    e) said housing having a wall portion forming a portion of said discharge duct sideward of both said waste water duct and said dish water duct
    f) providing a clean water duct connected to a faucet in the housing.

2. The assembly of claim 1 including a chamber at said fitting located to receive and merge flow paths from both said reverse osmosis waste water duct and said dish water duct, and for discharge of such flows to said discharge duct.

3. The assembly of claim 2 wherein said chamber includes a cap extending over upper open end of said dish water flow duct, the cap having a side entrance to pass reverse osmosis flow openly into merging relation with said dish water discharged via said open upper end.

4. The assembly of claim 3 wherein said housing that surrounds said ducts, is received in said kitchen sink associated panel, and with said chamber located above said panel.

5. The assembly of claim 1 wherein said housing that surrounds said ducts, is received in said kitchen sink associated panel.

6. The assembly of claim 1 including a reverse osmosis filter unit having a discharge in series connection with said waste water upright duct.

7. The assembly of claim 1 wherein said reverse osmosis waste water duct and said dish water upright duct have a primary common wall.

8. The assembly of claim 7 wherein said discharge duct and one of the following have a secondary common wall:
    said reverse osmosis waste water duct
    said dish water upright duct.

9. The assembly of claim 8 wherein said housing merges with said primary and secondary common walls.

10. A method which includes the steps of:
    a) providing a multi-ducted fitting, attached to a sink panel,
    b) providing a waste water upright duct associated with said fitting, and providing and operating reverse osmosis apparatus from which waste water flows to said duct,
    c) providing and operating a dish water upright duct associated with the fitting to flow unclean dish water upwardly,
    d) and providing and operating a discharge duct associated with the fitting to receive flows from both the reverse osmosis waste water duct, and the said dish water flow duct, for downward flow relative to the sink,
    e) there being a housing surrounding said ducts, to be received in a kitchen sink associated panel, f) said housing having a wall portion forming a portion of said discharge duct sideward of both said waste water duct and said dish water duct, and g) providing a clean water duct in the housing connected for discharging clean water to the faucet.

11. The method of claim 10 including openly discharging both of said flows within the fitting prior to reception of said flows into the discharge duct.

12. The method of claim 10 including providing a chamber at said fitting located to receive and merge flows from both said reverse osmosis waste water duct and said dish water duct, and for discharge of said merged flows to said discharge duct.

13. The method of claim 12 including providing a cap to extend over an upper open end of said dish water flow duct, the cap having a side entrance to pass reverse osmosis flow openly into merging relation with said dish water discharged via said open upper end.

14. In a system for handling closely proximate flows of relatively clean and unclean water, the combination comprising a) a first conduit for passing relatively clean water to a first discharge, b) a second conduit extending protectively about the first conduit, c) a third conduit extending proximate and lengthwise of the second conduit for receiving said relatively unclean water, outside the second conduit, d) and an outer housing extending about said first, second and third conduits, e) said third conduit having a free discharge proximate to, but isolated from the interior of said second conduit, f) there being a fourth conduit, proximate to said second and third conduits, and having an entrance to receive contaminated water discharge from a reverse osmosis filter means, and flowing from said second conduit, g) said second, third and fourth conduits configured such that i) said second and said third conduits have a primary common wall ii) said second and fourth conduits have a secondary common wall iii) said third and fourth conduits have a tertiary common wall, h) said primary, secondary and tertiary common walls having a common junction, i) and wherein said common walls extend arcuately away from said common junction, such that both said secondary common wall and said tertiary common wall bulge toward and into said fourth conduit, j) said fourth conduit having a flow cross section in a plane normal to lengthwise extent of the four conduits, that flow cross section characterized as located sidewardly of and having area substantially in excess of the total cross section areas of the first, second and third conduits.

15. The combination of claim 14 wherein said entrance is below the level of said free discharge.

16. The combination of claim 15 wherein said source comprises an automatic dishwasher having an outlet positioned for passing relatively unclean dish water, to flow in said third conduit.

17. The combination of claim 14 including a panel forming an opening through which said first, second, third and fourth conduits pass.

18. The combination of claim 17 wherein said free discharge and said entrance are located above the level of said opening in the panel, whereby contaminated water drains downwardly in said fourth conduit, through said opening, and clean water rises in the first conduit through said opening.

19. The combination of claim 14 wherein said second conduit terminates at a cap extending over said conduit.

20. The combination of claim 14 including an annular upright fitting integral with said common walls, and clamp fittings adjustably attached to said upright fitting for clamping at a position with the clamp fittings clamping to a panel defining an opening through which said first, second, third and fourth conduits extend.

* * * * *